United States Patent [19]

Allcock et al.

[11] 4,237,263

[45] Dec. 2, 1980

[54] POLY(MONOALKYL GROUP CONTAINING ORGANOPHOSPHAZENES) AND METHOD FOR THEIR PREPARATION

[75] Inventors: Harry R. Allcock; Robert J. Ritchie, both of State College, Pa.

[73] Assignee: The Firestone Tire & Rubber Company, Akron, Ohio

[21] Appl. No.: 40,802

[22] Filed: May 21, 1979

[51] Int. Cl.³ .............................................. C08G 83/00
[52] U.S. Cl. .................................. 528/399; 528/168; 564/12
[58] Field of Search .................. 528/399; 260/606.5 P

[56] References Cited

U.S. PATENT DOCUMENTS 3,169,933  2/1965  Liu et al. .............................. 528/399

FOREIGN PATENT DOCUMENTS 2712542  9/1977  Fed. Rep. of Germany ........... 528/399

Primary Examiner—Wilbert J. Briggs, Sr.

[57] ABSTRACT

Poly(organophosphazenes) containing one alkyl group per each three repeating units are prepared. These polymers are represented by the structure:

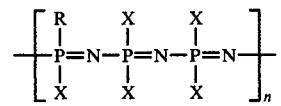

wherein R is alkyl containing from 1 to 10 carbon atoms; wherein X is selected from the group consisting of chlorine and —OR' radicals in which R' is the same as R or is selected from the group consisting of substituted alkyl radicals and substituted or unsubstituted aryl radicals and wherein n is from 3 to 15,000.

Polymers of the above structure in which X is chlorine are prepared by thermally polymerizing a monoalkyl-pentachloro-cyclotriphosphazene having the formula $N_3P_3Cl_5R$ in which R is as defined above. Polymers of the above structure in which X is an —OR' radical as defined above are prepared by thermally polymerizing the monoalkyl-pentachloro-cyclotriphosphazene and then reacting the resultant linear polymer with a suitable alkali metal alkoxide or aryloxide.

7 Claims, No Drawings

POLY(MONOALKYL GROUP CONTAINING ORGANOPHOSPHAZENES) AND METHOD FOR THEIR PREPARATION

BACKGROUND OF THE INVENTION

This invention relates to polyphosphazene polymers containing repeating

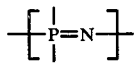

units in the polymer chain in which one alkyl group per each three repeating units is attached directly to the phosphorus atom and to a method of preparing such polymers. More particularly, the invention relates to polyphosphazene polymers containing units represented by the structure:

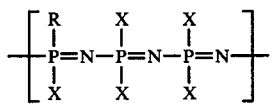

in which R is alkyl containing from 1 to 10 carbon atoms and X is chlorine or an —OR' radical (defined hereinafter) and to methods for the preparation of such polymers.

The polymerization of hexachlorocyclotriphosphazene, $(NPCl_2)_3$, to poly(dichlorophosphazene), $(NPCl_2)_n$, in which n is from 20 to 50,000, is a well-known reaction as illustrated by U.S. Pat. Nos. 3,370,020; 4,005,171 and 4,055,520. It constitutes the first step in the synthesis of stable poly(alkoxy- or aryloxyphosphazenes). $[NP(OR)_2]_2$, or poly(aminophosphazenes), $[NP(NHR)_2]_n$ or $[NP(NR_2)_2]_n$. These syntheses are accomplished by the utilization of $(NPCl_2)_n$ as a polymeric reactive intermediate for interactions with alkoxides, aryloxides, or amines. Poly(alkoxy or aryloxy phosphazenes) and poly(aminophosphazenes) and their method of preparation are described in the prior art as illustrated in the publications "Phosphorus-Nitrogen Compounds", Academic Press, New York, N.Y., 1972 by H. R. Allcock and "Poly(Organophosphazenes)", Chemtech, Sept. 19, 1975 by H. R. Allcock and in such patents as U.S. Pat. Nos. 3,515,688; 3,702,833; 3,856,712; and 4,042,561. A large number of high polymers have now been prepared by such techniques, and many of these have considerable fundamental and technological potential.

However, it has been recognized for some time that a further extension of this field to yield more-diverse polymers with specific properties (particularly high thermal stability) was dependent on the development of new synthesis routes that would allow alkyl or aryl groups to be linked directly to the phosphazene backbone through phosphorus-carbon bonds. The attainment of this goal has been the subject of intensive investigation in our laboratory, with an emphasis to date being placed on substitutive synthesis routes—i.e. on the reactions of organometallic reagents with poly(-dihalophosphazenes). The alternative route—the polymerization of per-alkyl- or arylcyclophosphazenes, $(NPR_2)_3$—has so far proved to be unsatisfactory. However, earlier work by Allcock and Moore appearing in the publication "Macromolecules", Volume 8, page 377 (1975) suggested that phosphazene trimers that contained both phenyl and halogeno substituent groups could be converted to low molecular weight polymers, although the steric size of the phenyl groups appeared to be detrimental to the polymerization process.

More recently, a method for the preparation of mono-methyl-pentachlorocyclotriphosphazene has been described in the article entitled "Hydridocyclophosphazenes Synthesis Via Organocopper Reagents" by Harris and Allcock appearing in the Journal of The American Chemical Society, Volume 100, page 6512 (1978). As described in the aforementioned article, the compound is prepared by reacting hexachlorocyclotriphosphazene, $(NPCl_2)_3$, with methyl magnesium chloride in tetrahydrofuran in the presence of $[n-(C_3H_7)_3P CuI]_4$ to first produce, after treatment with 2-propanol, a mono-methyl-hydridotetrachlorocyclotriphosphazene, following which this compound is reacted with chlorine.

SUMMARY OF THE INVENTION

In accordance with this invention, polyphosphazene polymers are prepared which contain units represented by the structure:

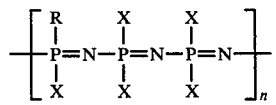

wherein R is an alkyl group containing from 1 to 10 carbon atoms; wherein X is chlorine or an —OR' radical, in which R' is the same as R or is selected from the group consisting of substituted alkyl radicals and substituted or unsubstituted aryl radicals and wherein n is an integer from 3 to 15,000.

Polyphosphazene polymers in which X in the above structure is chlorine are prepared by the thermal polymerization of a mono-alkyl-pentachlorocyclotriphosphazene having the formula $N_3P_3Cl_5R$ in which R is as defined above. Polyphosphazene polymers in which X in the above formula is the —OR' radical are prepared by reacting the polymer formed by the thermal polymerization of the $N_3P_3Cl_5R$ compound with a suitable alkoxide or aryloxide. Polyphosphazene polymers in which X in the above structure is an —OR' radical, especially a fluoroalkoxy radical, are elastomers. These polymers dependent on their specific composition may be utilized to form films and may also be used in applications such as coatings, foams and the like.

DETAILED DESCRIPTION OF THE INVENTION

As indicated, polymers of the invention in which X in the above formula is chlorine are prepared by thermally polymerizing a mono-alkyl-pentachlorocyclotriphosphazene represented by the formula $N_3P_3Cl_5R$ to form the linear mono-alkyl-pentachlorophosphazene polymer. When it is desired to produce polymers in which X in the above formula is an —OR' radical (i.e., an alkoxide or aryloxide), this is accomplished by reacting the linear mono-alkyl-pentachlorophosphazene polymer with a suitable alkali metal alkoxide or aryloxide.

The reaction scheme by which polymers of the invention are prepared proceeds as follows:

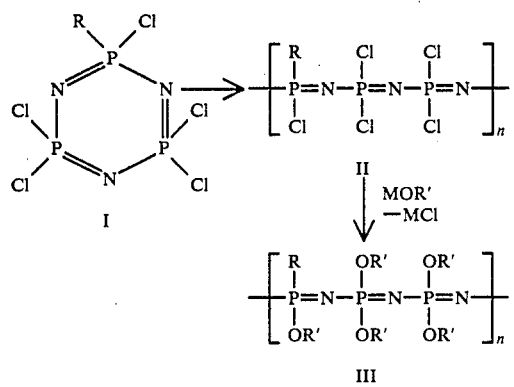

In the above formulas, R is an alkyl group containing from 1 to 10 carbon atoms, R' is the same as R or is a substituted alkyl radical or a substituted or unsubstituted aryl radical and n is an integer from 3 to 15,000.

As mentioned heretofore, the mono-alkylpentachlorocyclotriphosphazene compound (i.e. Structure I) employed as the starting material in the above reaction can be prepared by reacting hexachlorocyclotriphosphazene, $(NPCl_2)_3$, with RMgCl in the presence of an organocopper reagent such as $[n-(C_3H_7)_3P \; CuI]_4$ followed by treatment with a 2-propanol to first produce the monoalkylhydrido-tetrachlorocyclotriphosphazene following which this compound is reacted with chlorine to replace the hydrogen atom.

For a detailed description of the preparation of this compound, reference can be made to the article entitled "Hydridocyclophosphazenes, Synthesis By Organocopper Reagents" by Harris and Allcock, Journal of The American Chemical Society, Volume 100, Page 6512 (1978), the disclosure of which is incorporated herein by reference.

The linear polymers represented by structure II are prepared by thermal polymerization of the starting compound, I. If the reaction conditions are carefully controlled, polymers of structure II are uncrosslinked and are soluble in a variety of organic solvents such as tetrahydrofuran, benzene or toluene. In this regard, careful control of the polymerization temperature is particularly important. Thus, the polymerization temperature should not exceed about 250° C. as temperatures much above 250° C. can result in carbonization. The preferred polymerization temperature range is from 210° to 250° C.

The linear polymers represented by structure III are prepared by well known derivatization techniques such as those described in the publications "Phosphorus-Nitrogen Compounds" and "Poly(Organophosphazenes)" by H. R. Allcock mentioned above and in such patents as U.S. Pat. Nos. 3,515,688; 3,702,833; 3,856,712; and 4,042,561. Thus, these polymers are prepared by reacting the linear polymer of structure II with an alkali metal alkoxide or aryloxide represented by the formula MOR' in which M is an alkali metal such as sodium, potassium, or lithium and R' is a substituted or unsubstituted alkyl or aryl radical.

The alkali metal alkoxides or aryloxides represented by MOR' are formed in known manner by reacting the alkali metal with a substituted or unsubstituted aliphatic or aromatic alcohol.

A wide variety of aliphatic alcohols or aromatic alcohols may be utilized in forming the alkali metal alkoxide or aryloxide employed in the reaction. Specific aliphatic or aromatic alcohols which may be utilized in forming the alkali metal alkoxide or aryloxide employed in the reaction are dependent on the nature of the alkoxy or aryloxy group which is desired to be incorporated in the polymers of the invention.

The preferred alkoxy groups (substituted or unsubstituted) may be derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluoro-butanol; 2,2,3,3-tetrafluoropropanol; 2,2,3,3,4,4,5,5-octafluoropentanol; 2,2,3,3,4,4,5,5,6,6,7,7-dodecafluoroheptanol and the like. Mixtures of the foregoing aliphatic alcohols may also be employed.

The preferred aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m- chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

As indicated, preferred substituent groups represented by —OR' for use in these polymers are substituted or unsubstituted alkoxy groups and aryloxy groups (e.g. —OR' groups in which R' is a substituted or unsubstituted alkyl or aryl radical) and of these fluoroalkoxy especially trifluoroethoxy groups are particularly preferred.

The following examples are submitted for the purpose of further illustrating the nature of the invention and are not intended as a limitation on the scope thereof. Parts and percentages shown in the examples are by weight unless otherwise indicated.

EXAMPLE 1

PREPARATION OF POLYMER OF STRUCTURE III IN WHICH R IS $CH_3$ AND OR' IS —$OCH_2CF_3$

Highly purified mono-methyl-pentachlorocyclotriphosphazene, $N_3P_3CH_3Cl_5$ (4.0 g, 0.012 mol) was sealed in an evacuated (0.05 torr) Pyrex tube. The tube was heated at 250° C. for 24 hr by which time the viscosity of the polymerizate had risen almost to the point of immobilization. Unpolymerized $N_3P_3CH_3Cl_5$ as removed from the reaction mixture by sublimation at 70° C./0.05 torr. The residual polymer (2.5 g) was then dissolved in tetrahydrofuran (50 ml), and this solution was added dropwise to a solution of sodium trifluoroethoxide (prepared from 1.8 g of sodium and 7.8 g of trifluoroethanol) in tetrahydrofuran (100 ml). After the reaction mixture had been heated at 65° C. for 24 hrs., the polymer was isolated by precipitation into dilute hydrochloric acid. Further purification was effected by precipitation from tetrahydrofuran into water or hexane (over-all yield=40%). The product was a colorless, opalescent, film-forming elastomer.

The structure of the polymer was confirmed by microanalysis and by the infrared spectrum. Microanalysis of the polymer showed the following values:

Calculated*(%) C, 20.42; H, 2.01; N, 6.49; P, 14.36; F, 44.04. Actual (%) C, 20.54; H, 2.16; N, 6.50; P, 14.51; F, 39.51.

*Based on polymer containing 16.6 percent $CH_3$ and 83.4 percent $OCH_2CF_3$.

A $^{31}P$ nmr spectrum showed two separate multiplets with peaks at $+19.84$, $+19.49$, $+17.31$, $+16.24$, and at $-7.97$, $-8.32$, $-8.74$, and $-9.11$ ppm respectively. The molecular weight was estimated by gel permeation chromatography to be $1 \times 10^6$.

EXAMPLE 2

PREPARATION OF POLYMER OF STRUCTURE III IN WHICH R=CH₃ AND OR'=-OC₆H₅

Highly purified mono-methyl-pentachlorocyclotriphosphazene, $N_3P_3CH_3Cl_5$ (4.0 g, 0.012 mol) was sealed in an evacuated (0.05 torr) Pyrex tube. The tube was heated at 250° C. for 24 hrs by which time the viscosity of the polymerizate had risen almost to the point of immobilization. Unpolymerized $N_3P_3CH_3Cl_5$ was removed by sublimation at 70° C./0.05 torr. The residual polymer (2.5 g) was then dissolved in 1,4-dioxane (100 ml), and this solution was added dropwise to a solution of sodium phenoxide (prepared from 8.7 g of sodium and 40.0 g of phenol) in 1,4-dioxane (300 ml). After the reaction mixture had been heated at 100° C. for 168 hrs, the polymer was isolated by precipitation into dilute hydrochloric acid. Further purification was effected by precipitation from tetrahydrofuran into water, ethanol, or hexane (over-all yield=45%). The product was a colorless, opalescent, film-forming elastomer.

The structure of the polymer was confirmed by microanalysis and by the infrared spectrum. Microanalysis of the polymer showed the following values:

Calculated*(%) C, 60,52; H, 4.55; N, 6.82; P, 15.09. Actual (%) C, 60.32; H, 4.66; N, 6.71; P, 15.12.

*Based on a polymer containing 16.6% $CH_3$ and 83.4% $OC_6H_5$

A $^{31}P$ NMR spectrum showed two separate multiplets with peaks at $+11.34$, $+11.05$, $+10.71$, $+10.20$, $+10.51$, and at $-18.46$, $-18.58$, $-18.94$, $-19.36$, $-19.53$, and $-19.77$ ppm, respectively. The molecular weight was estimated by gel permeation chromatography to be $1.5 \times 10^6$.

Polymers of structure III in which R is ethyl, n-propyl, butyl, hexyl, octyl and the like and OR' is alkyl phenoxy, halophenoxy and the like may be similarly prepared.

We claim:

1. A polyphosphazene polymer containing units represented by the structure:

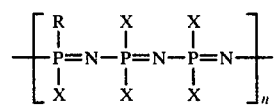

wherein R is alkyl containing from 1 to 10 carbon atoms; wherein X is selected from the group consisting of chlorine and —OR' radicals in which R' is the same as R or is selected from the group consisting of substituted alkyl radicals and substituted or unsubstituted aryl radicals and wherein n is from 3 to 15,000.

2. The polyphosphazene polymer of claim 1 wherein R is CH₃ and X is Cl.

3. The polyphosphazene polymer of claim 1 wherein R is CH₃ and X is —OCH₂CF₃.

4. A method of preparing polyphosphazene polymers containing units represented by the structure:

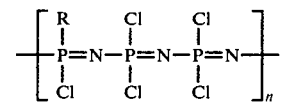

wherein R is alkyl containing from 1 to 10 and n is from 3 to 15,000, said method comprising thermally polymerizing a compound having the structure:

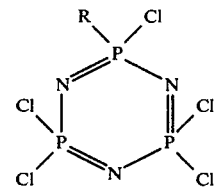

wherein R is alkyl containing from 1 to 10 carbon atoms, at temperatures of from about 210° to 250° C.

5. The method of claim 4 wherein R in said compound is CH₃.

6. A method of preparing polyphosphazene polymers containing units represented by the structure:

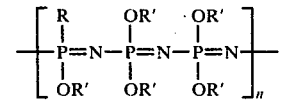

wherein R is alkyl containing from 1 to 10 carbon atoms wherein R' is R or is selected from the group consisting of substituted alkyl radicals and substituted or unsubstituted aryl radicals and wherein n is from 3 to 15,000; said method comprising the steps of:

(a) thermally polymerizing a compound having the structure:

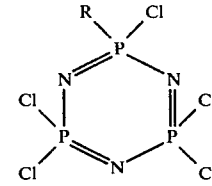

wherein R is alkyl containing from 1 to 10 carbon atoms, at the temperature of 210° to 250° C. to thereby form a linear polymer having the structure:

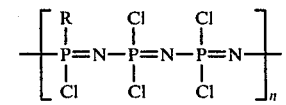

wherein n is from 3 to 15,000; and (b) reacting said linear polymer with a compound having the formula MOR' in which M is an alkali metal selected from the group consisting of Na, K and Li and R' is a substituted or unsubstituted alkyl or aryl radical.

7. The method of claim 6 wherein R is CH₃ and OR' is —OCH₂CF₃.

* * * * *